United States Patent
Guarnieri et al.

(10) Patent No.: US 10,956,562 B2
(45) Date of Patent: Mar. 23, 2021

(54) DEVELOPING APPLICATIONS USING PRECISE STATIC SECURITY ANALYSIS

(71) Applicant: International Business Machines Corporation, Armonk, NY (US)

(72) Inventors: Salvatore A. Guarnieri, New York, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 15/622,424

(22) Filed: Jun. 14, 2017

(65) Prior Publication Data
US 2018/0365414 A1 Dec. 20, 2018

(51) Int. Cl.
*G06F 21/54* (2013.01)
*G06F 21/57* (2013.01)
*G06F 16/23* (2019.01)

(52) U.S. Cl.
CPC .......... *G06F 21/54* (2013.01); *G06F 16/2379* (2019.01); *G06F 21/577* (2013.01)

(58) Field of Classification Search
CPC ..... G06F 21/54; G06F 16/2379; G06F 21/577
See application file for complete search history.

(56) References Cited

U.S. PATENT DOCUMENTS

| | | | | |
|---|---|---|---|---|
| 10,127,386 B2 * | 11/2018 | Li | ...................... | G06F 11/3604 |
| 10,133,649 B2 * | 11/2018 | Li | ...................... | G06F 11/3604 |
| 2006/0282897 A1 * | 12/2006 | Sima | ................... | G06F 11/3664 726/25 |
| 2007/0240138 A1 | 10/2007 | Chess et al. | | |
| 2012/0185943 A1 | 7/2012 | Tripp | | |
| 2013/0031531 A1 * | 1/2013 | Keynes | ..................... | G06F 8/74 717/126 |
| 2014/0075561 A1 * | 3/2014 | Guarnieri | ............ | H04L 63/1408 726/25 |
| 2014/0317747 A1 * | 10/2014 | Tripp | .................. | G06F 11/3644 726/25 |
| 2016/0224793 A1 * | 8/2016 | Lu | ......................... | G06F 21/577 |

OTHER PUBLICATIONS

Ganesh, V. et al., "HAMPI: A String Solver for Testing, Analysis and Vulnerability Detection", 2011, pp. 1-19.

(Continued)

*Primary Examiner* — Lynn D Feild
*Assistant Examiner* — Abdullah Almamun
(74) *Attorney, Agent, or Firm* — Scully, Scott, Murphy & Presser, P.C.; Daniel Morris, Esq.

(57) ABSTRACT

A security analysis of an application is performed by encoding predicates during a first operation by asserting a set of data flow facts comprising a mapping from a variable to a security-relevant substring of a string of the application. A respective truth value is associated with each data flow fact of the set of data flow facts. The set of data flow facts and each truth value are stored in a tangible computer-readable memory device. The truth value of at least one data flow fact of the set of data flow facts is updated in at least one subsequent operation using a set of abstract transformers to eliminate or reduce a security vulnerability in the application.

16 Claims, 3 Drawing Sheets

(56) References Cited

OTHER PUBLICATIONS

Fairley, R., "Tutorial: Static Analysis and Dynamic Testing of Computer Software", Nov. 10, 2015, pp. 1-15.
Anonymous, "Prioritized impact analysis combined by static and dynamic analysis", Apr. 4, 2012, pp. 1-2.
Anonymous, "Using static analysis results to direct dynamic analysis for security testing" Aug. 17, 2011, pp. 1-6.

* cited by examiner

DEVELOPING APPLICATIONS USING PRECISE STATIC SECURITY ANALYSIS

FIELD

The present disclosure relates generally to application development and analysis tools and, more specifically, to developing applications using precise static security analysis.

BACKGROUND

One challenge in performing static security analysis is to account for operations that sanitize and validate user-provided inputs in a sound and accurate manner. Consider the following example where input data is received from a user. The input data, which is initially considered untrusted, undergoes manipulations in the form of inline string operations:

```
String name = request.getParameter("name");
name = name.replace('<', '');
name = name.replace('>', '');
name = name.replace("script", " ");
...
response.getWriter( ).write("Welcome, " + name);
```

The foregoing inline string operations do not present security vulnerabilities if the inline replace calls preceding the call to write suffice to block all forms of cross-site scripting (XSS) attacks, by removing all the tokens that could be used for an XSS attack. However, as a practical matter, it is difficult to verify that all forms of XSS attacks have, indeed, been blocked.

One way of verifying that security vulnerabilities do not exist is by performing string analysis, where string values and their flow within the program are approximated statically. This approach has two fundamental limitations: lack of scalability, and lack of remediation. String-analysis solutions typically exhibit poor scalability. This is mainly because the cost of modeling string values as well as string transformations—which form a very rich abstract domain—is extremely high. In terms of remediation, string analysis provides little if any feedback on the steps that must be taken to fix the unsecure code. For example, a software developer may become aware that there is a flow of untrusted data from a statement reading user input to a security-sensitive statement, but it is very difficult for the developer to pinpoint the problem and propose a practical solution.

Unfortunately, in many real-world applications, the defense measures used to ensure the safety of the application involve complicated logic. Applications involving industry-grade codes are quite large, and so string-analysis technologies are impractical. One practical solution used in the context of some commercial products is known as taint analysis Taint analysis allows a user to manually specify methods for sanitizing and validating the code. Considering the exemplary set of string operations discussed previously, the user could refactor the code so that all the string operations are packaged as a single sanitize method, and specify this method as a sanitizer as follows:

```
String name = request.getParameter("name");
name = sanitize(name);
...
response.getWriter( ).write("Welcome, " + name);
```

This sanitize method solution is problematic in terms of generating false positives, generating false negatives, providing little guidance in terms of remediation, and requiring high annotation overhead. In terms of false negatives, the user's specification is assumed—rather than verified—to be correct. If the user states that a sanitizer is correct, but the sanitizer in fact is not correct, then the analysis might suffer from false negatives (i.e., true vulnerabilities not being reported). Moreover, false positives are also problematic because the analysis cannot account for inline validation and sanitization logic. False positives may also arise in situations where the user provides an incomplete specification, where the user forgot to mention certain sanitizers or validators.

If the sanitize method does locate a vulnerability, then the user is given little information as to the missing sanitization or validation steps. This lack of information complicates remediation of the problem, and increases the probability of an incorrect remediation being applied. High annotation overhead is needed because the user is required to specify sanitizer and validator methods manually. This manual process is both burdensome and error prone. Moreover, as demonstrated previously, in some cases the user needs to first refactor the code to organize input transformations into a single method. Thus, there exists a need to overcome at least one of the preceding deficiencies and limitations of the related art.

SUMMARY

The following summary is merely intended to be exemplary. The summary is not intended to limit the scope of the claims.

A method for performing a security analysis of an application, the method comprising: encoding a respective set of one or more predicates during a first operation by asserting a corresponding set of data flow facts each comprising a mapping from a variable to a security-relevant substring of the application; associating a respective truth value with each data flow fact of the corresponding set of data flow facts; storing the corresponding set of data flow facts and each respective truth value; and updating the respective truth value of at least one data flow fact of the corresponding set of data flow facts in at least one subsequent operation using a set of abstract transformers to eliminate or reduce a security vulnerability in the application.

A computer program product for performing a security analysis of an application, in another aspect, comprises a computer-readable storage medium having a computer-readable program stored therein, wherein the computer-readable program, when executed on a computing device including at least one processor, causes the at least one processor to encode a respective set of one or more predicates during a first operation by asserting a corresponding set of data flow facts each comprising a mapping from a variable to a security-relevant substring of the application; associate a respective truth value with each data flow fact of the corresponding set of data flow facts; store the corresponding set of data flow facts and each respective truth value; and update the respective truth value of at least one data flow fact of the corresponding set of data flow facts in at least one subsequent operation using a set of abstract transformers to eliminate or reduce a security vulnerability in the application.

An apparatus for performing a security analysis of an application, in another aspect, comprises a processor and a non-transitory computer-readable memory coupled to the processor, wherein the memory comprises instructions which, when executed by the processor, cause the processor to encode a respective set of one or more predicates during a first operation by asserting a corresponding set of data flow facts each comprising a mapping from a variable to a security-relevant substring of the application; associate a respective truth value with each data flow fact of the corresponding set of data flow facts; store the corresponding set of data flow facts and each respective truth value; and update the respective truth value of at least one data flow fact of the corresponding set of data flow facts in at least one subsequent operation using a set of abstract transformers to eliminate or reduce a security vulnerability in the application.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
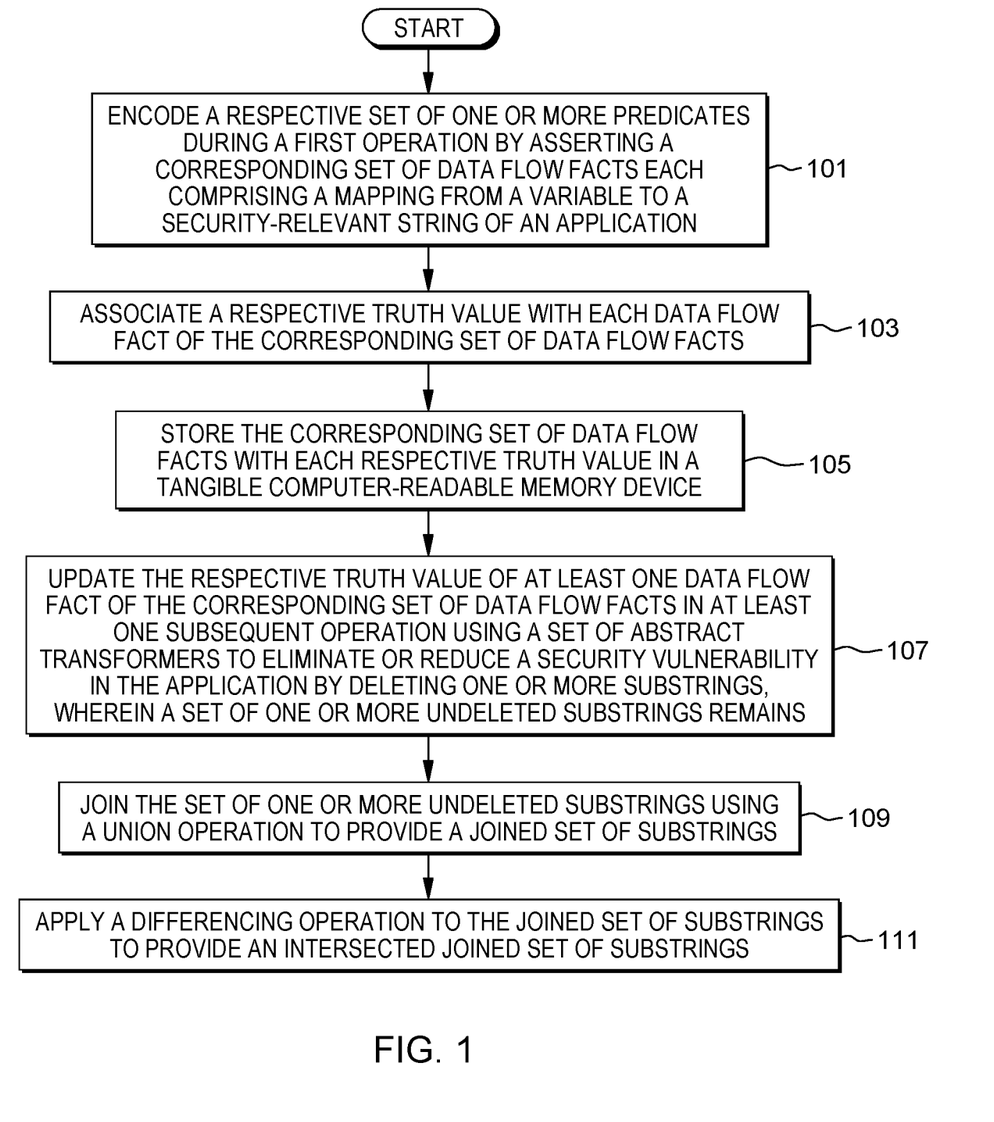
FIG. 1 illustrates an exemplary method for performing a security analysis of an application in accordance with one or more embodiments of the present invention.

FIG. 1 illustrates an exemplary method for performing a security analysis of an application in accordance with one or more embodiments of the present invention. The method commences at block 101 where a respective set of one or more predicates is encoded during a first operation by asserting a corresponding set of data flow facts each comprising a mapping from a variable to a security-relevant substring of the application. Thus, encoding refers to a process of representing the predicate using a sequence of characters, such as letters, numbers, punctuation, binary code, or symbols, where the predicate represents a set of data flow facts.

A predicate is a statement comprising one or more variables that may be true or false depending on the values of the one or more variables. The predicate may be conceptualized as an operator or function that returns a value that is either true or false. For example, predicates are used to indicate set membership. When talking about sets, it is sometimes inconvenient or impossible to describe a set by listing all of its elements. Thus, a predicate P(x) will be true or false, depending on whether x belongs to the set.

Predicates are used to characterize the properties of objects by defining the set of all objects that have some property in common. So, for example, when P is a predicate on X, it is said that P is a property of X. Similarly, the notation P(x) is used to denote a sentence or statement P concerning the variable object x. The set defined by P(x) is written as {x|P(x)}, and is just a collection of all the objects for which P is true. For instance, {x|x is a natural number less than 4} is the set {1,2,3}. If t is an element of the set {x|P(x)}, then the statement P(t) is true. Here, P(x) is referred to as the predicate, and x is a subject of a proposition. Sometimes, P(x) is also called a propositional function, as each choice of x produces a proposition. One exemplary form of a predicate is a Boolean expression, in which case the inputs to the expression are themselves Boolean values, combined using Boolean operations.

The first operation of block 101 may comprise a static analysis where the set of data flow facts comprise one or more assertions about one or more substrings contained within the string of the application. Alternatively or additionally, the first operation of block 101 may comprise a dynamic analysis within an instrumented interpreter, where the set of data flow facts comprise one or more assertions about one or more substrings contained within the string of the application. Alternatively or additionally, the first operation of block 101 may comprise a static and dynamic analysis within an instrumented interpreter, where the set of data flow facts comprise one or more assertions indicative of whether or not each of one or more substrings contained within the string of the application are untrusted.

The procedure of FIG. 1 proceeds to block 103 where a respective truth value is associated with each data flow fact of the corresponding set of data flow facts. Next, at block 105, the corresponding set of data flow facts is stored with each respective truth value in a tangible computer-readable memory device. Then, at block 107, the respective truth value of at least one data flow fact of the corresponding set of data flow facts is updated in at least one subsequent operation using a set of abstract transformers to eliminate or reduce a security vulnerability in the application. The subsequent operation occurs subsequently to the first operation. The abstract transformers comprise one or more replace operations for deleting a substring, such that a set of one or more undeleted substrings remains.

The procedure then advances to block 109 where the set of one or more undeleted substrings is joined by performing a union operation on the set of one or more undeleted substrings to generate a joined set of substrings. Next, at block 111, a differencing operation is performed on the joined set of substrings to provide an intersected joined set of substrings.

The procedure of FIG. 1 provides technical features, effects, and enhancements in terms of reduced annotation overhead, accuracy, remediation, and scalability. With regard to reduced annotation overhead, the security analysis no longer requires a user specification. Sanitization and validation operations are accounted for automatically by virtue of the abstract transformers. Similarly, there is no need for refactoring steps for grouping string operations into a single method. Considering accuracy, the procedure of FIG. 1 addresses false negatives due to incorrect specifications, as well as false positives due to inline sanitization and validation. In terms of remediation, if the security analysis discovers a vulnerable data flow, then the user is provided with exact information on the offending illegal characters or substrings that flowed into the security-sensitive operation. This enables quick comprehension of the security problem, and highlights which remediation steps need to be employed to fix the problem. In contrast to string analysis where the abstract domain is extremely rich due to the need to account for string values, rather than the question of whether the string contains specific security-related substrings, the abstract domain utilized by the procedure of FIG. 1 is finite and small, thereby enabling fast and scalable static security analysis to be performed.

Figure 2:
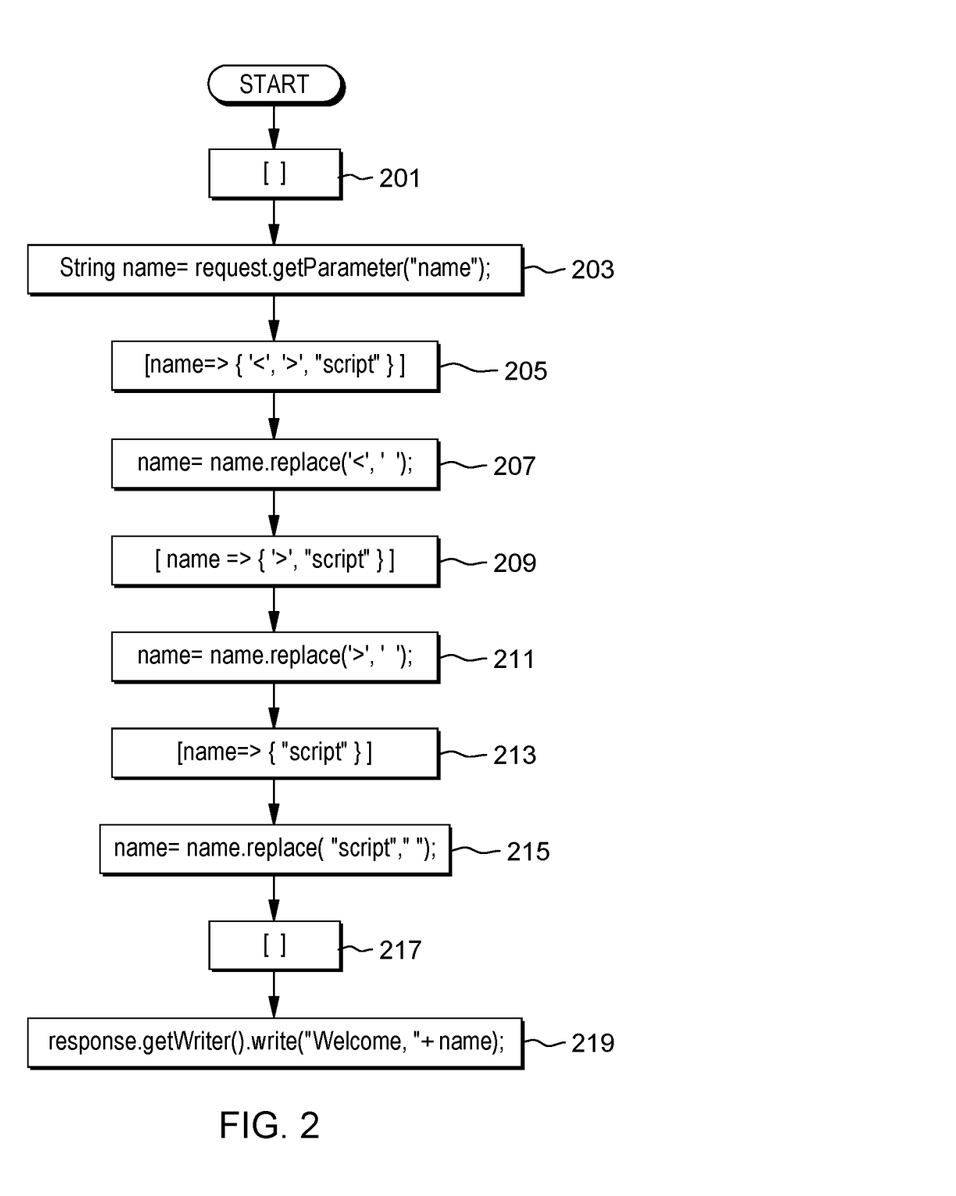
FIG. 2 illustrates an exemplary portion of an application on which the method of FIG. 1 is performed in accordance with one or more embodiments of the present invention.

FIG. 2 illustrates an exemplary portion of an application on which the method of FIG. 1 is performed in accordance with one or more embodiments of the present invention. Sets of square brackets [ ] are used to denote the tracked data flow facts previously discussed in connection with block 101 of FIG. 1. Returning to FIG. 2, at block 201, a set of empty brackets [ ] is used to denote that, prior to a call to a getParameter subroutine, there is no untrusted data flowing within the application. Then, at block 203, the call to the getParameter subroutine takes place. After this call, at block 205, a parameter name is assigned to a value input by a user. The mapping of the parameter name to a set {'<', '>', "script"} denotes that these substrings need to be eliminated from name before name can safely flow into a security-sensitive operation.

The subsequent replace calls of blocks 207-215 achieve this elimination, and thus the set is updated moving from one replace call to the next, until finally at block 217, there is no untrusted data flowing within the application. Then, at block 219, data flowing into a security-sensitive write operation is safe, and a false issue is suppressed.

Figure 3:
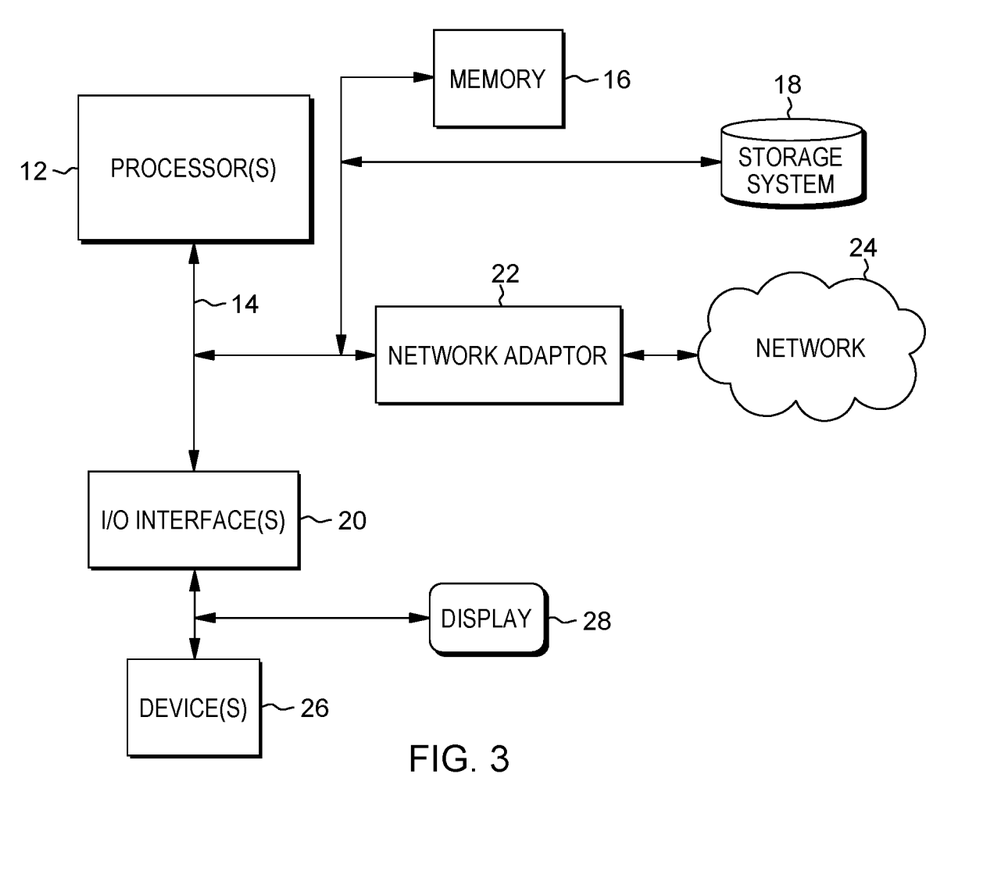
FIG. 3 illustrates an exemplary apparatus on which the method of FIG. 1 may be performed in accordance with one or more embodiments of the present invention.

FIG. 3 illustrates an exemplary apparatus on which the method of FIG. 1 may be performed in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for performing a security analysis of an application, the method comprising:
    prior to running a security-sensitive operation involving a variable assigned an input value received from a user, encoding a respective set of one or more predicates during a first operation by asserting a corresponding set of data flow facts each comprising a mapping from the variable to a set of security-relevant substrings of a string of the application, the set of security-relevant substrings required to be eliminated from the application, and the set of one or more predicates used to define a set of all objects that have at least one property in common;

associating a respective truth value with each data flow fact of the corresponding set of data flow facts;

storing the corresponding set of data flow facts and each respective truth value in a tangible computer-readable memory device; and updating the respective truth value of at least one data flow fact of the corresponding set of data flow facts in at least one subsequent operation using a set of abstract transformers to eliminate or reduce a security vulnerability in the application, an abstract transformer of said set comprising a replace operation for deleting a substring of the application, such that a set of one or more undeleted substrings remains.

2. The computer-implemented method of claim 1 wherein the first operation further comprises a static security analysis of the application.

3. The computer-implemented method of claim 1 wherein the first operation further comprises a dynamic security analysis of the application using an instrumented interpreter.

4. The computer-implemented method of claim 1 wherein the first operation further comprises a static and dynamic security analysis within an instrumented interpreter, and the corresponding set of data flow facts further comprises one or more assertions indicative of whether or not each of one or more substrings contained within the string of the application are untrusted.

5. The computer-implemented method of claim 1 further comprising joining the set of one or more undeleted substrings by performing a union operation on the set of one or more undeleted substrings to generate a joined set of substrings.

6. The computer-implemented method of claim 5 further comprising performing a differencing operation on the joined set of substrings to provide an intersected joined set of substrings.

7. A computer program product for performing a security analysis of an application, the computer program product comprising a computer-readable storage medium having a computer-readable program stored therein, wherein the computer-readable program, when executed on a computing device including at least one processor, causes the at least one processor to:

prior to running a security-sensitive operation involving a variable assigned an input value received from a user, encode a respective set of one or more predicates during a first operation by asserting a corresponding set of data flow facts each comprising a mapping from the variable to a set of security-relevant substrings of a string of the application, the set of security-relevant substrings required to be eliminated from the application, and the set of one or more predicates used to define a set of all objects that have at least one property in common;

associate a respective truth value with each data flow fact of the corresponding set of data flow facts;

store the corresponding set of data flow facts and each respective truth value in a tangible computer-readable memory device; and update the respective truth value of at least one data flow fact of the corresponding set of data flow facts in at least one subsequent operation using a set of abstract transformers to eliminate or reduce a security vulnerability in the application, an abstract transformer of said set comprising a replace operation for deleting a substring of the application, such that a set of one or more undeleted substrings remains.

8. The computer program product of claim 7 wherein the first operation further comprises a static security analysis of the application.

9. The computer program product of claim 7 wherein the first operation further comprises a dynamic security analysis of the application using an instrumented interpreter.

10. The computer program product of claim 7 wherein the first operation further comprises a static and dynamic security analysis within an instrumented interpreter, and the corresponding set of data flow facts further comprises one or more assertions indicative of whether or not each of one or more substrings contained within the string of the application are untrusted.

11. The computer program product of claim 7 further comprising instructions for joining the set of one or more undeleted substrings by performing a union operation on the set of one or more undeleted substrings to generate a joined set of substrings.

12. The computer program product of claim 11 further comprising instructions for performing a differencing operation on the joined set of substrings to provide an intersected joined set of substrings.

13. An apparatus for performing a security analysis of an application, the apparatus comprising a processor and a memory coupled to the processor, wherein the memory comprises instructions which, when executed by the processor, cause the processor to:

prior to running a security-sensitive operation involving a variable assigned an input value received from a user, encode a respective set of one or more predicates during a first operation by asserting a corresponding set of data flow facts each comprising a mapping from the variable to a set of security-relevant substrings of a string of the application, the set of security-relevant substrings required to be eliminated from the application, and the set of one or more predicates used to define a set of all objects that have at least one property in common;

associate a respective truth value with each data flow fact of the corresponding set of data flow facts;

store the corresponding set of data flow facts and each respective truth value in a tangible computer-readable memory device; and update the respective truth value of at least one data flow fact of the corresponding set of data flow facts in at least one subsequent operation using a set of abstract transformers to eliminate or reduce a security vulnerability in the application, an abstract transformer of said set comprising a replace operation for deleting a substring of the application, such that a set of one or more undeleted substrings remains.

14. The apparatus of claim 13 wherein the first operation further comprises a static security analysis of the application.

15. The apparatus of claim 13 wherein the first operation further comprises a dynamic security analysis of the application using an instrumented interpreter.

16. The apparatus of claim 13 wherein the first operation further comprises a static and dynamic security analysis within an instrumented interpreter, and the corresponding set of data flow facts further comprises one or more assertions indicative of whether or not each of one or more substrings contained within the string of the application are untrusted.

* * * * *